(12) United States Patent
Whatmough et al.

(10) Patent No.: US 11,823,430 B2
(45) Date of Patent: Nov. 21, 2023

(54) VIDEO DATA PROCESSING

(71) Applicant: Arm Limited, Cambridge (GB)

(72) Inventors: Paul Nicholas Whatmough, Cambridge, MA (US); Patrick Thomas Hansen, Cambridge, MA (US)

(73) Assignee: Arm Limited, Cambridge (GB)

( * ) Notice: Subject to any disclaimer, the term of this patent is extended or adjusted under 35 U.S.C. 154(b) by 214 days.

(21) Appl. No.: 17/378,014

(22) Filed: Jul. 16, 2021

(65) Prior Publication Data

US 2023/0019360 A1    Jan. 19, 2023

(51) Int. Cl.
*G06V 10/25* (2022.01)
*G06F 18/24* (2023.01)
*G06N 3/045* (2023.01)

(52) U.S. Cl.
CPC .............. *G06V 10/25* (2022.01); *G06F 18/24* (2023.01); *G06N 3/045* (2023.01); *G06T 2207/10016* (2013.01); *G06T 2207/20132* (2013.01)

(58) Field of Classification Search
CPC ........ G06V 10/25; G06V 10/22; G06V 10/82; G06F 18/24; G06N 3/045; G06T 2207/10016; G06T 2207/20132
See application file for complete search history.

(56) References Cited

U.S. PATENT DOCUMENTS

| 8,620,078 | B1 * | 12/2013 | Chapleau | G06V 30/153 382/173 |
| 2012/0105668 | A1 * | 5/2012 | Velarde | H04N 23/71 348/229.1 |
| 2014/0152773 | A1 * | 6/2014 | Ohba | H04N 13/204 348/46 |
| 2021/0365707 | A1 * | 11/2021 | Mao | G06V 10/25 |
| 2022/0217310 | A1 * | 7/2022 | Matsubara | H04N 21/4343 |
| 2022/0414830 | A1 * | 12/2022 | Hunt | G06F 18/24143 |

FOREIGN PATENT DOCUMENTS

WO    2021121548 A1    6/2021

OTHER PUBLICATIONS

Hansen et al., "ISP4ML: The Role of Image Signal Processing in Efficient Deep Learning Vision Systems", Mar. 17, 2021, arxiv.org.
United Kingdom Combined Search and Examination report dated Jan. 18, 2023 for United Kingdom Application No. GB2210447.5.

* cited by examiner

*Primary Examiner* — John B Strege
(74) *Attorney, Agent, or Firm* — EIP US LLP

(57) ABSTRACT

A method for processing video data, comprising: receiving raw video data, representative of a plurality of frames; detecting, using the raw video data, one or more regions of interest in a detection frame that belongs to the plurality of frames, for example using a region proposal network; performing a cropping process on a portion of the raw video data representative of the detection frame, based on the regions of interest, so as to generate cropped raw video data; performing image processing on the cropped raw video data, including demosaicing, so as to generate processed image data for the detection frame; and analyzing the processed image data, for example using an object detection process, to determine information relating to at least one of said one or more regions of interest.

9 Claims, 6 Drawing Sheets

VIDEO DATA PROCESSING

BACKGROUND OF THE INVENTION

Field of the Invention

The present invention relates to methods, systems and apparatus for processing video data. It may be particularly (but is not exclusively) suited for use in computer vision applications.

Description of the Related Technology

Processing video data may be energy intensive, generating considerable amounts of heat and, in battery-powered devices, quickly exhausting battery life, especially with high frequency and/or high definition video. Processing video data may also require or consume a large amount of bandwidth to transfer video data between different processes, with such transferring of video data also potentially being energy intensive, again, especially with high frequency and/or high definition video. It is desirable to improve the energy efficiency and/or lessen the bandwidth demands of video processing.

SUMMARY

According to a first aspect of the present disclosure, there is provided a method of processing video data, the method comprising: receiving raw video data, representative of a plurality of frames; detecting, using said raw video data, one or more regions of interest in a detection frame of said plurality of frames; performing a cropping process on a portion of the raw video data representative of the detection frame, based on said one or more regions of interest, so as to generate cropped raw video data; performing image processing on said cropped raw video data, including demosaicing, so as to generate processed image data for the detection frame; and analyzing said processed image data to determine information relating to at least one of said one or more regions of interest.

According to a second aspect of the present disclosure, there is provided a video processing system comprising: an imaging device, which comprises an image sensor; at least one processor; and storage accessible by the at least one processor, having stored thereon instructions which, when executed by the at least one processor, cause the at least one processor to: receive raw video data, which is representative of a plurality of frames and has been generated by said image sensor; detect, using said raw video data, one or more regions of interest in a detection frame of said plurality of frames; perform a cropping process on a portion of the raw video data representative of the detection frame, based on said one or more regions of interest, so as to generate cropped raw video data; perform image processing on said cropped raw video data, including demosaicing, so as to generate processed image data for the detection frame; and analyze said processed image data to determine information relating to at least one of said one or more regions of interest.

According to a further aspect of the present disclosure there is provided a non-transitory, computer-readable storage medium comprising a set of computer-readable instructions which, when executed by at least one processor, cause the at least one processor to: receive raw video data, which is representative of a plurality of frames and has been generated by an image sensor of an imaging device; detect, using said raw video data, one or more regions of interest in a detection frame of said plurality of frames; perform a cropping process on a portion of the raw video data representative of the detection frame, based on said one or more regions of interest, so as to generate cropped raw video data; perform image processing on said cropped raw video data, including demosaicing, so as to generate processed image data for the detection frame; and analyze said processed image data to determine information relating to at least one of said one or more regions of interest.

BRIEF DESCRIPTION OF THE DRAWINGS

Further features will become apparent from the following description, given by way of example only, which is made with reference to the accompanying drawings, in which.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily other examples. It should be further noted that certain examples are described schematically with certain features omitted and/or necessarily simplified for ease of explanation an understanding of the concepts underlying the examples.

Processing video data may be energy intensive, generating considerable amounts of heat and, in battery-powered devices, quickly exhausting battery life, especially with high frequency and/or high definition video. Computer vision applications may be particularly energy intensive, as they often involve computationally intensive algorithms.

Methods described in accordance with embodiments of this disclosure carry out image processing, including demosaicing, on cropped raw video data that corresponds to regions of interest that are detected in raw video data. In such methods, energy and processing demands associated with image processing may be concentrated on portions of the video data having greater significance, as they are based on regions of interest in the raw video data. Such an approach may thus, in some cases, result in a lower overall processing burden and/or lower overall energy demand.

Figure 1:
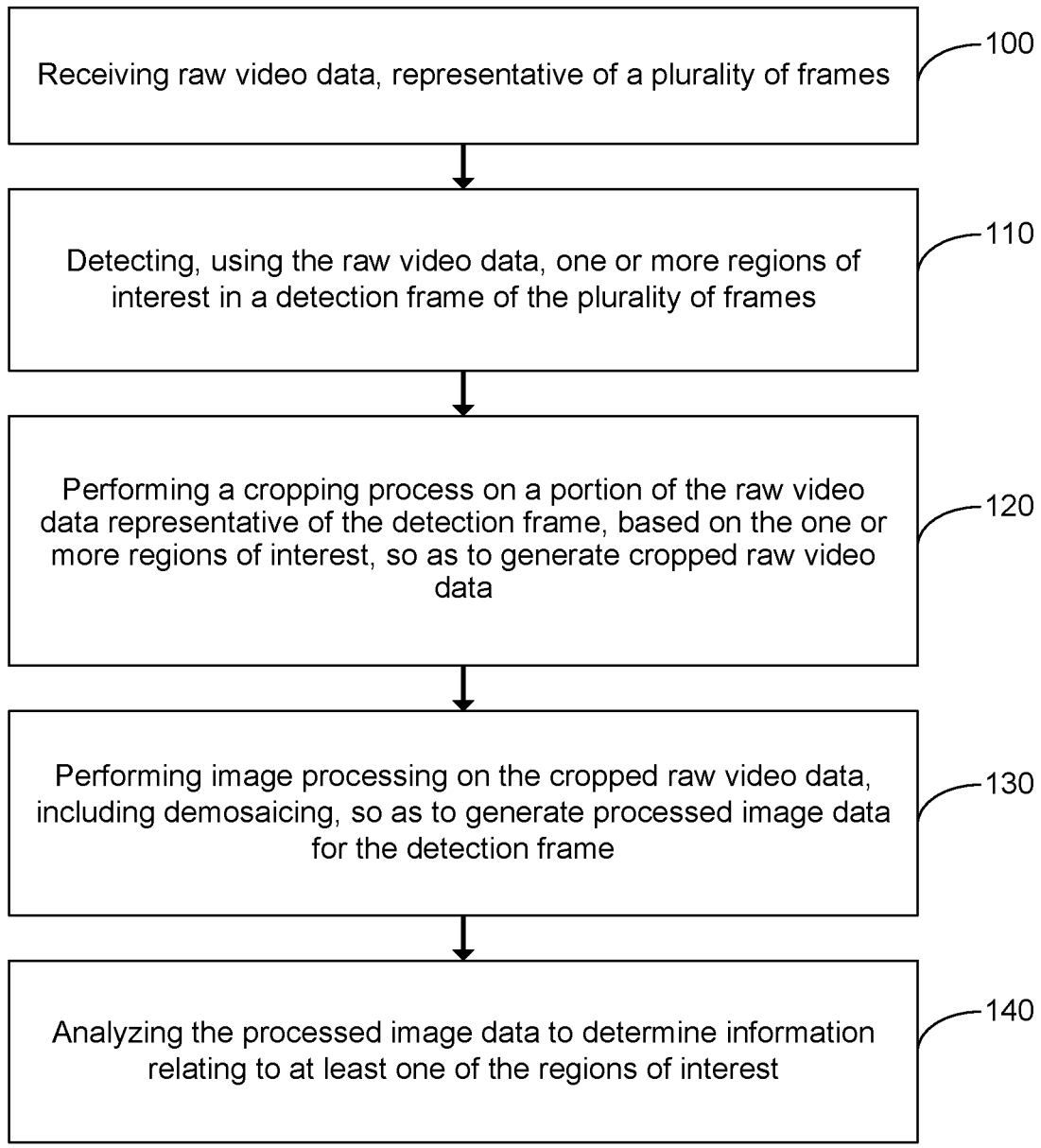
FIG. 1 is a flow diagram showing a method of processing video data according to a first embodiment of the disclosure.

Referring now to the Figures, attention is firstly directed to FIG. 1, which is a flow diagram showing a method of processing video data 100 according to a first embodiment of the disclosure. The method 100 of FIG. 1 may be implemented using a video processing system, such as the video processing system 1 illustrated schematically in FIG. 6 and described below.

As shown in FIG. 1, the method 100 includes a step 110 of receiving raw video data 10, representative of a plurality of frames 11. Though not essential, method 100 may be carried out in real time, for example acting on raw video data 10 as it is received (for instance as a video stream).

Figure 2A:
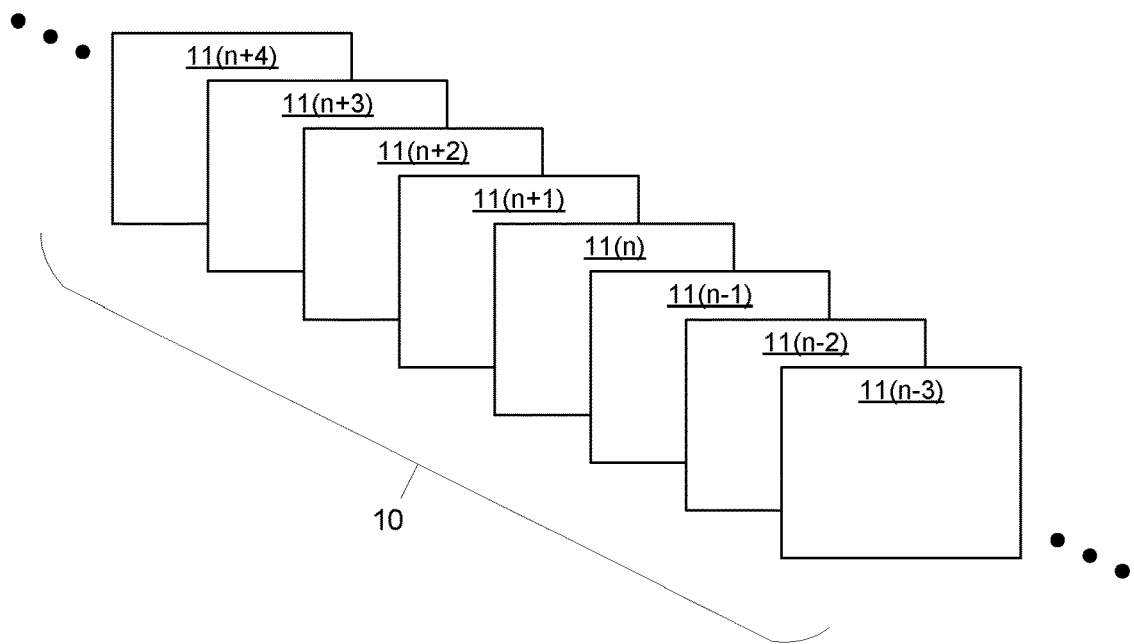
FIGS. 2A and 2B are schematic diagrams illustrating features of the method of FIG. 1.

FIG. 2A illustrates such raw video data 10 diagrammatically. The frames 11 represented in the video data 10 are shown in the drawing, with individual input frames 11 being identified by suffixes (n−3)-(n+4).

Figure 2B:
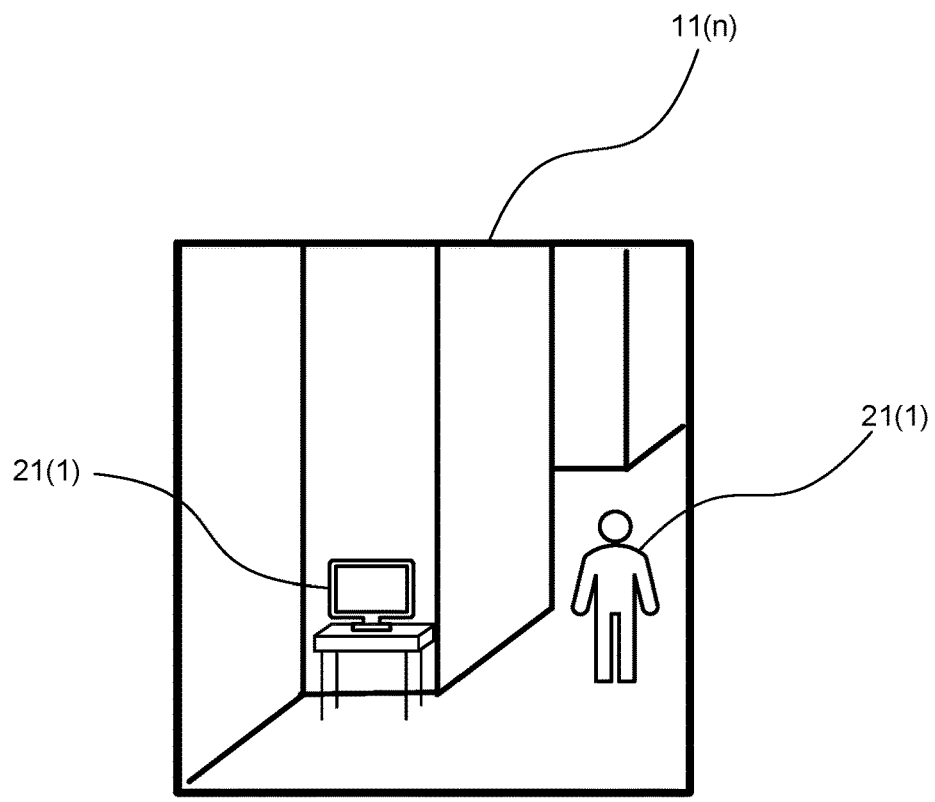

A frame for example corresponds to a still image, as illustrated in FIG. 2B. A series or sequence of such frames, which typically represent a series of sequential images, can be considered to correspond to a video or a moving picture. A frame generally includes a plurality of pixels, for example disposed in a rectangular array.

Figure 6:
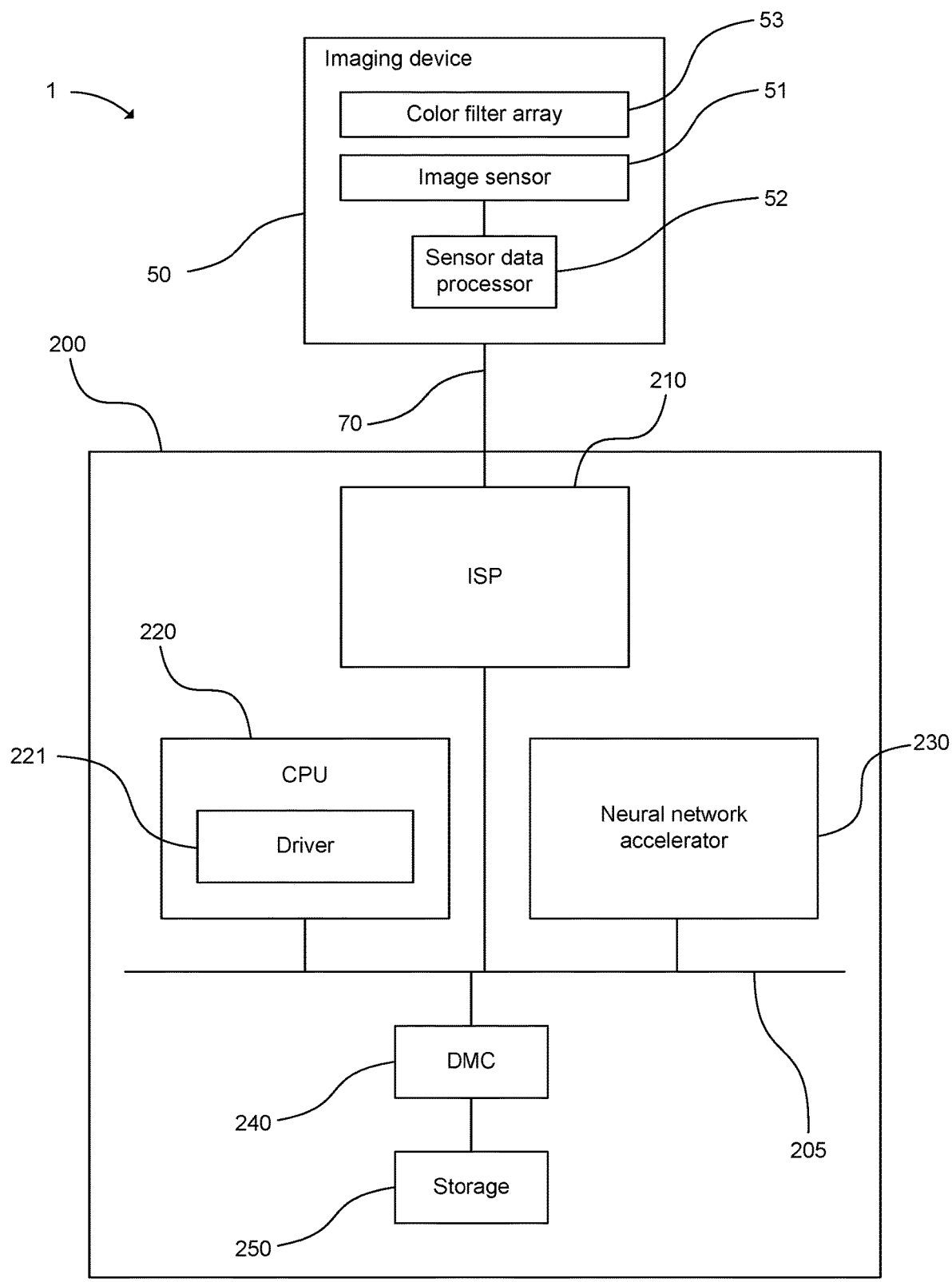
FIG. 6 is a schematic diagram illustrating internal components of a video processing system according to an embodiment of this disclosure.

Raw video data is, for example, video data on which little if any processing has taken place following its generation by an image sensor, such as image sensor 51 of imaging device 50 shown in FIG. 6. In particular, raw video data has not undergone a demosaicing or debayering process. With the aid of information relating to the structure of a color filter array 53 that overlies the image sensor 51, such processes generate a color image from raw video/image data. (It will therefore be appreciated that, although FIG. 2B illustrates detection frame 11(n) as an image/picture, a frame of raw video data is, by its nature, typically unintelligible to a human; hence, FIG. 2B and other drawings that illustrate raw video data with images/pictures are to be understood as diagrammatic representations to aid the reader's understanding.) As discussed in more detail below with reference to FIG. 6, an image sensor 51 typically includes an array of sensor pixels, which may be any suitable sensors for capturing images, such as photosensors Returning to FIG. 1, the method 100 further includes a step 110 of detecting, using the raw video data 10, one or more regions of interest 20 in a detection frame 11(n) of the plurality of frames 11. Various processes are considered suitable for detecting such regions of interest. For example, the detecting of the regions of interest 20 may comprise performing feature detection, feature extraction, objection detection and/or object recognition processes. Furthermore, in some examples, the detecting of the regions of interest may utilize a neural network, such as, for example, a region proposal network (RPN), for instance the RPN used in Faster R-CNN. Where the detecting of the regions of interest utilizes a neural network, such a neural network may suitably be trained using raw image and/or raw video data. It is to be understood, however, that use of a neural network is not essential and that, in other examples, detecting of the regions of interest may utilize feature detection or extraction algorithms such as the scale-invariant feature transform (SIFT) algorithm, the speeded up robust features (SURF) algorithm, or the histogram of oriented gradients (HOG) algorithm.

The method 100 further includes a step 120 of performing a cropping process on a portion of the raw video data representative of the detection frame 11(n), so as to generate cropped raw video data. The cropping process is based on the one or more regions of interest 20 detected in step 110.

Figure 3A:
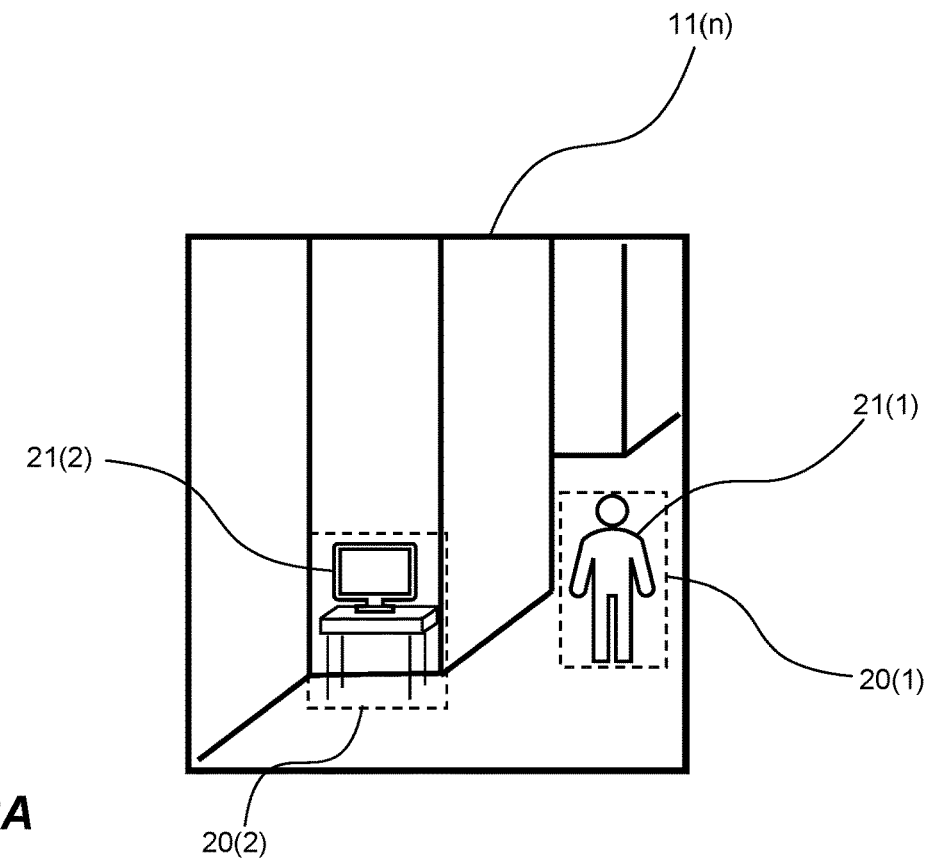
FIGS. 3A and 3B are schematic diagrams illustrating an example of a cropping process that may be carried out as part of the method of FIG. 1.
Figure 3B:
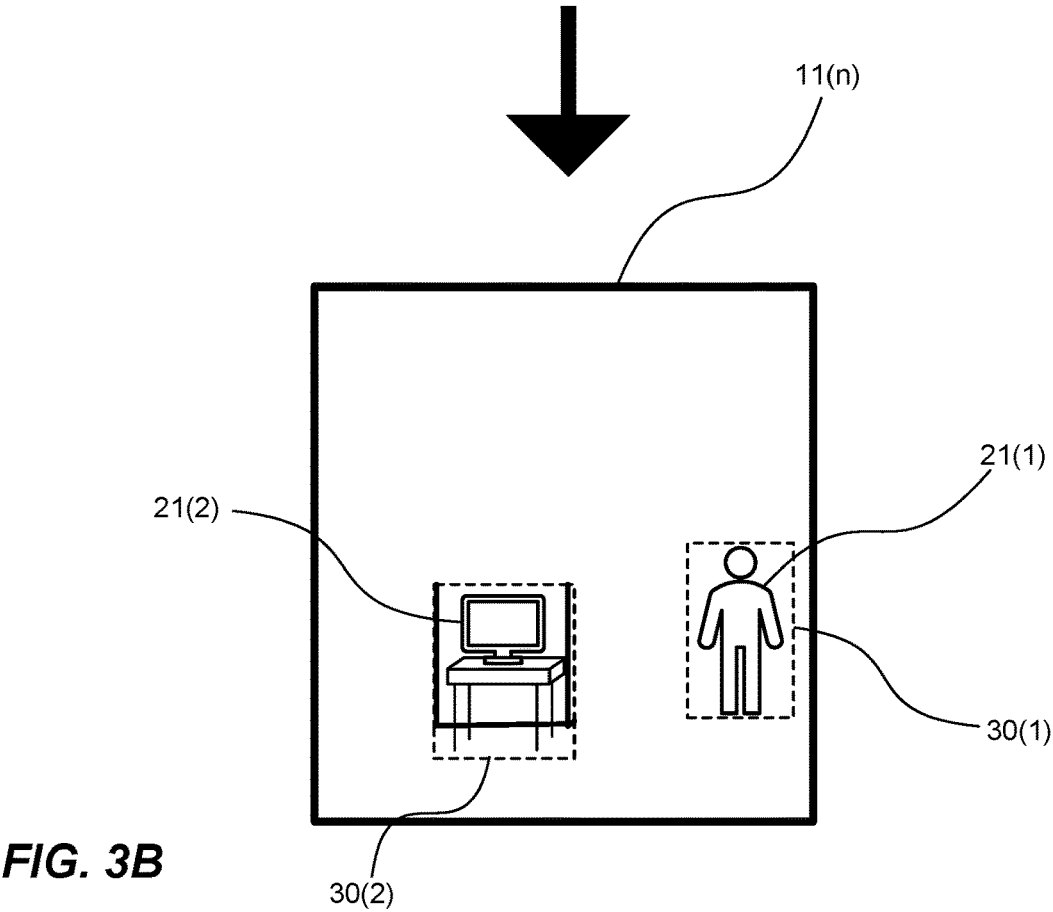

An example of a cropping process is shown in FIGS. 3A and 3B, which illustrate, respectively, raw video data and cropped raw video data for a detection frame 11(n). In the example cropping process shown in FIGS. 3A and 3B, data defining the parts of the detection frame 11(n) outside of the regions of interest 20(1), 20(2) are discarded. Thus, the data remaining after the cropping process 30(1), 30(2) is representative solely of the regions of interest 20 detected in step 110.

As also illustrated in FIGS. 3A and 3B, the detecting of the regions of interest carried out in step 110 comprises performing an object detection process on the raw video of the detection frame 11(n). In consequence, two objects 21(1), 21(2), a person and a desktop computer, are detected within the detection frame 11(n). However, it is by no means essential that the detecting of regions of interest in step 110 comprises performing an object detection process. As noted above, it could instead comprise performing feature detection and/or feature extraction processes or any other suitable processes on the raw video.

As further illustrated in FIGS. 3A and 3B, the regions of interest detected in step 110 may, for example, be rectangular. Hence, they are illustrated in FIGS. 3A and 3B as bounding boxes. In some cases, carrying out step 110 such that rectangular regions of interest 20 are detected may simplify later processing steps, such as the image processing of step 130 (which includes demosaicing and is discussed in detail below) may be simplified. Nevertheless, it will be appreciated that, in other embodiments, step 110 may be carried out such that regions of interest with non-rectangular shapes are detected in step 110.

Figure 4A:
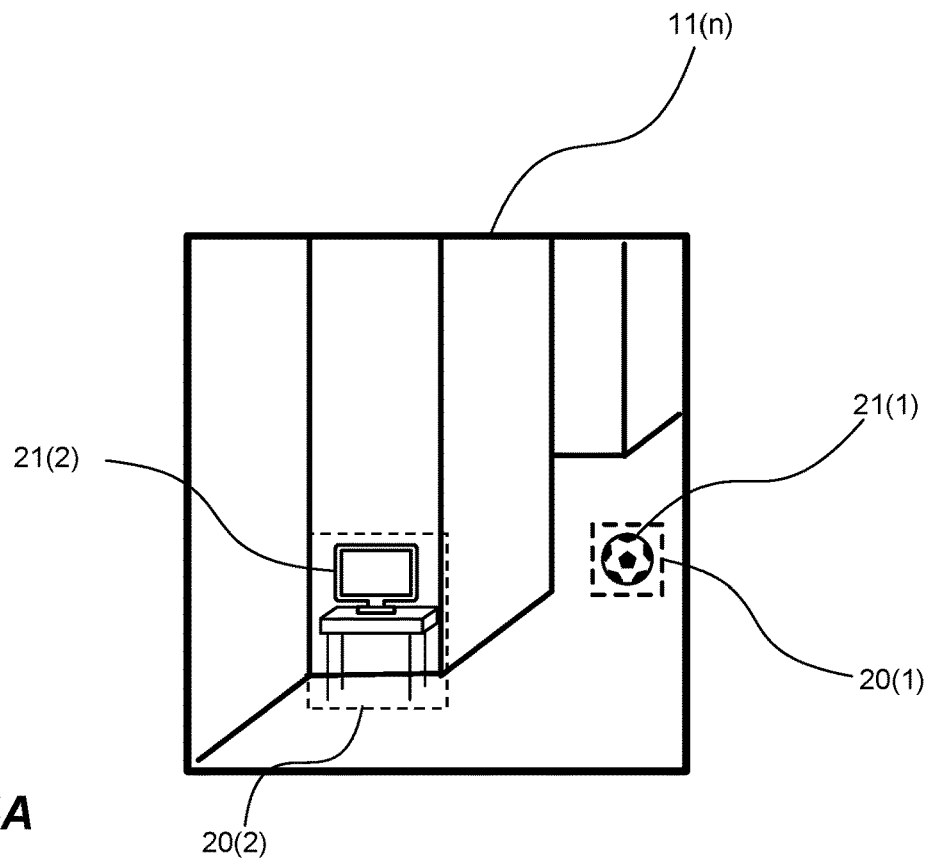
FIGS. 4A and 4B are schematic diagrams illustrating a further example of a cropping process that may be carried out as part of the method of FIG. 1.
Figure 4B:
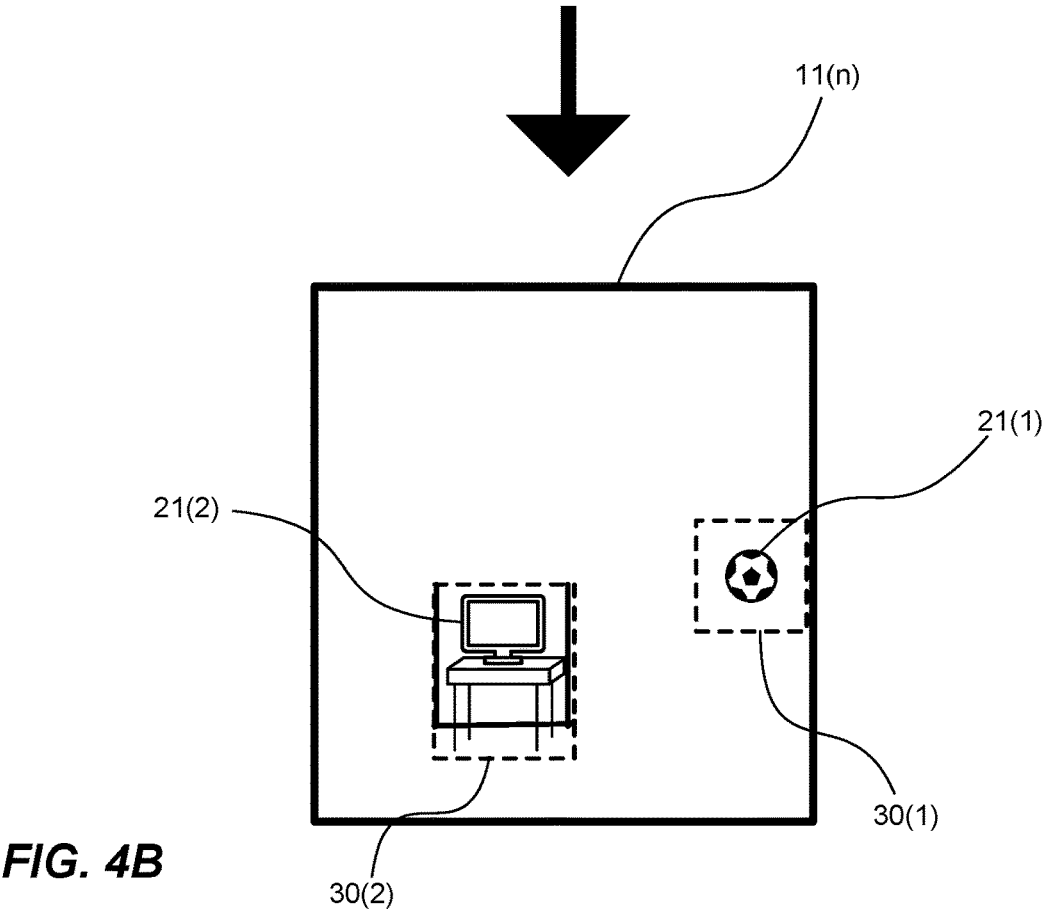

Attention is now directed to FIGS. 4A and 4B, which illustrate a further example of a cropping process in like manner to FIGS. 3A and 3B. In the example shown, one of the regions of interest 20(1) is particularly small. (In the particular situation shown, this is a result of the small area of the frame 11(n) that is occupied by object 21(1), a soccer ball, to which region of interest 20(1) corresponds.) As illustrated in FIG. 4B, the cropping process crops to an area that is larger than region of interest 20(1). This may, for example, simplify later processing steps, such as the image processing of step 130 (discussed below), particularly where such later processing steps are able to operate only on video data corresponding to a part of a frame with at least a minimum area. In such cases, the cropping process may crop to areas greater than or equal to the minimum area.

Figure 5A:
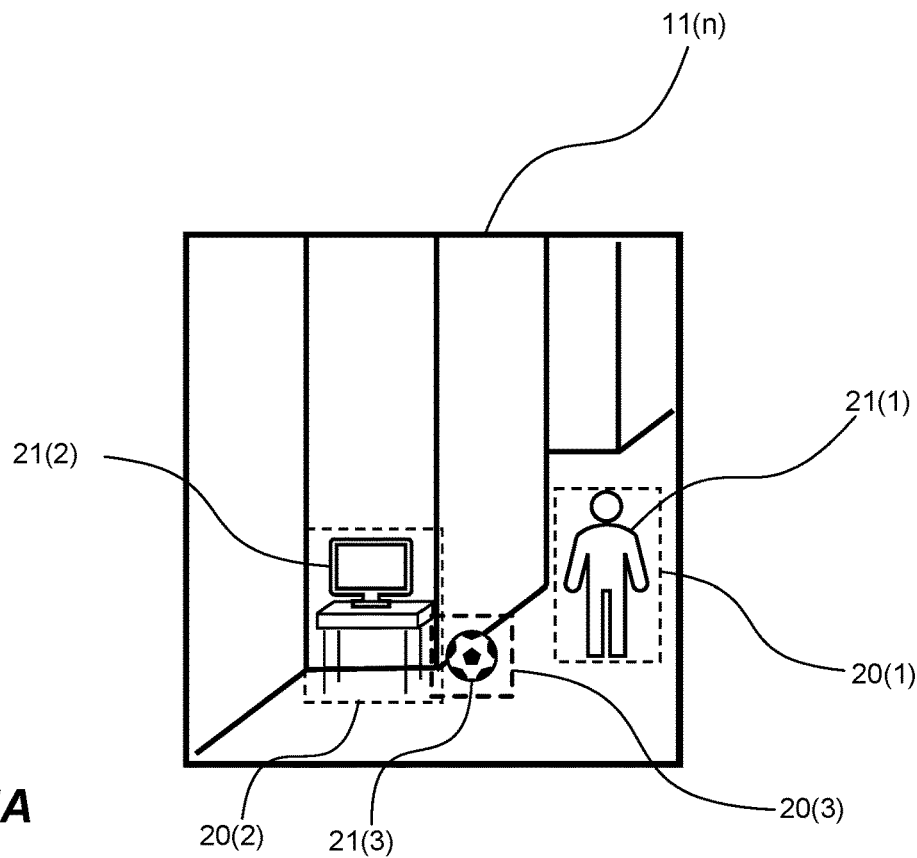
FIGS. 5A and 5B are schematic diagrams illustrating a still further example of a cropping process that may be carried out as part of the method of FIG. 1.
Figure 5B:
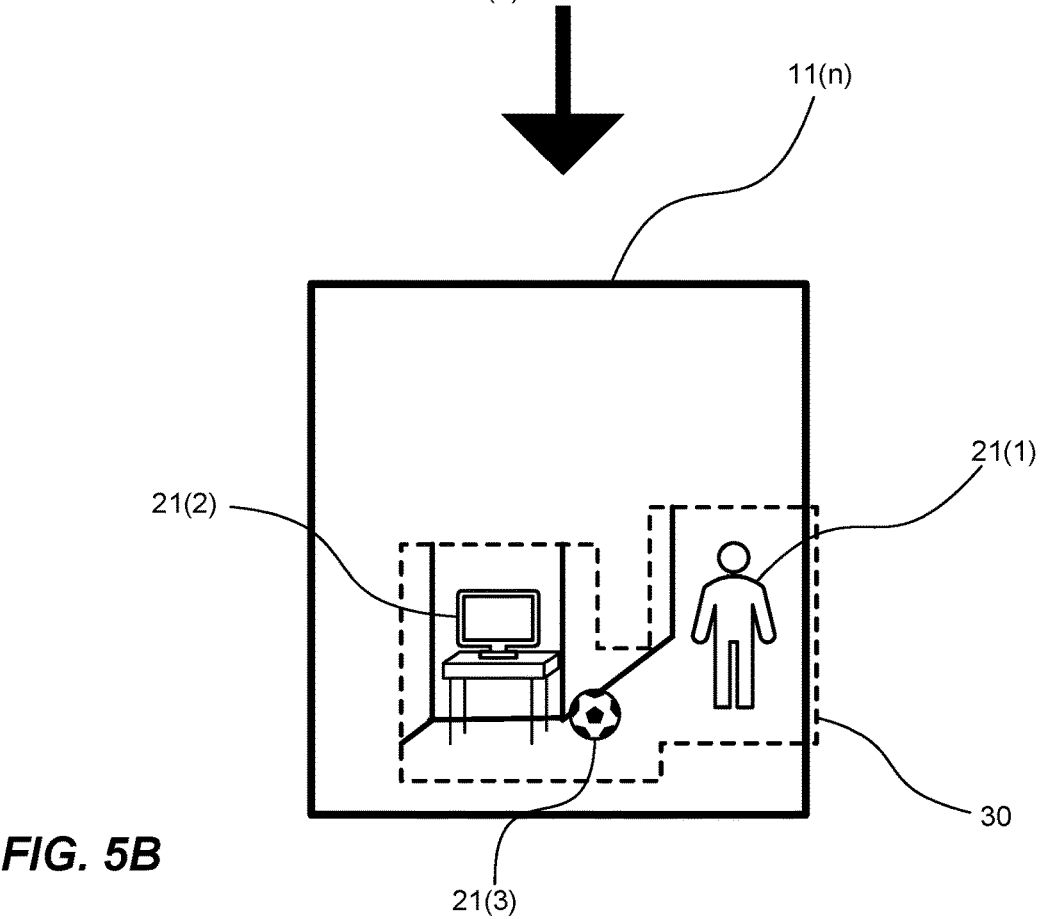

Attention is directed next to FIGS. 5A and 5B, which illustrate a still further example of a cropping process in like manner to FIGS. 3A and 3B and FIGS. 4A and 4B. In the example shown, the cropping process crops to an area that corresponds to (e.g. is centered on) but is larger than a respective one of the regions of interest 20 detected in step 110. Cropping to such enlarged areas may lessen the impact of inaccuracies in determining regions of interest in step 110, which may, for example, result from low contrast in the use of raw data.

It will be noted that the enlarged areas overlap. In some embodiments, step 130 may output cropped raw video data that corresponds to a merger of all the overlapping areas. In other embodiments, step 130 may output a respective portion of cropped raw video data for each of the areas, despite their overlap. As a further alternative, rather than outputting a merged area with a complex perimeter, the cropping process might crop to a rectangular bounding box that encompasses the overlapping areas. This might, in some cases, simplify later processing steps, which may be better able to handle data representative of a frame portion shaped as a rectangle.

In general, FIGS. 4A and 4B and FIGS. 5A and 5B demonstrate that the cropped raw video data generated by the cropping process of step 120 need not be representative solely of the regions of interest 20 detected in step 110, as was the case in the example shown in FIGS. 3A and 3B. Rather, in the examples of FIGS. 4A-5B, the cropped raw video data is representative of one or more areas within the detection frame 11(n) that include or encompass the regions of interest 20.

Still more generally, it is envisaged that, in some embodiments, the cropping process of 120 may generate cropped raw video data that is representative of one or more areas within the detection frame 11(n) that do not strictly encompass the regions of interest. For example, some or all such areas might overlap with or be wholly or partly contained within the regions of interest 20. This may be done, for instance, to simplify later processing steps.

Nevertheless, it will be appreciated that, in all the embodiments discussed above, the cropping process is based on the one or more regions of interest 20 detected in step 110.

Returning to FIG. 1, the method 100 further includes a step 130 of performing image processing on the cropped raw video data, so as to generate processed image data for the detection frame 11(n). Such image processing includes, in particular, demosaicing of the raw video data, but may include additional processes, such as tone mapping (e.g. using histogram equalization), black level subtraction, white balance adjustment, color correction, sharpening, gamma correction and/or noise reduction. As discussed in more detail below with reference to FIG. 6, such image processing may, for example, be carried out by an image signal processor (ISP) 210 of a video processing system 1.

Typically, such image processing will output processed image data that is defined with reference to a particular color model, such as RGB or YUV. Hence, the processed image data may be representative of N intensity values for each of a number of pixels, where N is the number of colors of the color model used (e.g. three in the case of an RGB color model). In contrast, the raw video data is typically representative of only one raw intensity value for each pixel, but represents a much larger number of pixels (even accounting for the cropping of step 120).

The image processing carried out as part of step 130 may be costly in terms of energy and processing demands. However, because it is performed on cropped raw video data, which in turn is generated based on regions of interest in the raw video data, such demands may be concentrated on the portions of the video having greater significance. Such an approach may thus, in some cases, result in a lower overall processing burden and/or lower overall energy demand, without significant effect on performance.

In some embodiments, the image processing of step 130 may carried out with the same or similar parameters for all the cropped raw video data for the detection frame 11(n). This may, for example, ensure consistent processing of the cropped raw video data. However, in other embodiments, separate (e.g. non-overlapping) areas of the detection frame 11(n) represented within the cropped raw video data may be processed independently. For instance, tone mapping, black level subtraction, white balance correction, color correction, sharpening, gamma correction and/or noise reduction might be carried out independently on each such area.

Referring once more to FIG. 1, the method 100 further includes a step 140 of analyzing the processed image data (as generated in the image processing of step 130) to determine information relating to at least one of the regions of interest 20. In some cases, such analyzing may have high accuracy as a result of being carried out on processed image data, rather than on raw video data.

In embodiments where the detecting of the regions of interest in step 110 utilizes a neural network (such as a region proposal network (RPN)), the analyzing of the processed image data in step 140 will typically use a different neural network.

In many embodiments, the analyzing of the processed image data in step 140 may include performing a computer vision process. For instance, it might include performing an objection detection process and/or an object classification process on the processed image data. In other embodiments, it might include performing a motion estimation process using the processed image data.

Where each of the detecting of regions of interest of step 110, and the analyzing of the processed image data in step 140 includes performing an object detection process, respective, different object detection processes may be used in each case. (This may be suitable because step 140 is carried out on processed image data, whereas step 110 is carried out on raw video data.) In such embodiments, the object detection process carried out as part of step 140 may, for example, be described as a refinement of the object detection process carried out as part of step 110. For instance, the object detection process carried out as part of step 140 may have a greater computational complexity, specificity (e.g. is able to distinguish between different object classes) and/or accuracy than that of the object detection process carried out as part of step 110. Furthermore, the analyzing of the processed image data in step 140 might include not only object detection, but also object classification and/or image segmentation. Again, this may be suitable because step 140 is carried out on processed image data, whereas step 110 is carried out on raw video data.

It should be understood that it is by no means essential that step 140 comprises computer vision processes such as objection detection and/or an object classification processes. In further embodiments, step 140 might, for example, include a super-resolution process instead of (or in addition) to such processes.

In some embodiments, data defining each region of interest may be explicitly generated in step 110 and utilized in later processes, such as, for example, the analyzing of the processed image data in step 140. However, in other embodiments, the regions of interest might only be defined implicitly in the processed image data, as a result of the processed image data being generated by the cropping process of step 120, which is in turn based on the regions of interest 20.

It is envisaged that information regarding the size and/or number of regions of interest may be used to achieve energy efficient video processing. Hence (or otherwise), in some embodiments of method 100, system resources, such as memory and/or processing resources, may be scaled depending on a total magnitude (e.g. a total area, or a weighted sum) of regions of interest detected in a detection frame 11(n). For instance, method 100 may optionally include a further step of scaling processing resources for the analyzing of step 140, or for further processes that are reliant upon processed image data, in dependence upon a total magnitude of regions of interest. For example, the method may comprise varying the frequency and/or voltage at which one or more processors operate, and/or varying the number of processors utilized in dependence upon such a total magnitude of regions of interest. Thus, in some examples, dynamic frequency and/or dynamic voltage scaling may be utilized. A total magnitude of regions of interest may serve as an indicator of likely workload for processes that follow the determination of the regions of interest, including in particular computer vision processes, and hence scaling processing resources in dependence thereupon may conserve processing resources, may reduce power usage, and/or may reduce heat generation, without significant effect on performance.

Although steps 110-140 have been described above in the context of one detection frame 11($n$), it should be appreciated that such steps may be repeated for successive frames represented in the raw video data (e.g. frames 11($n$+1), 11($n$+2), 11($n$+3) etc.). For example, such steps could be carried out in respect of each frame 11, or they could be carried out at constant frequency, that is, on every nth frame (where n is a constant). As a further alternative, steps 110-140 could be carried out at a frequency that varies depending on a total magnitude (e.g. a total area, or a weighted sum) of regions of interest detected in the previous detection frame (or detection frames). For example, the frequency might be positively related to such a total magnitude of regions of interest so that more processing is carried out where the preceding frames were more "interesting" and, conversely, less processing is carried out where there is little or nothing of interest in the preceding frames.

Attention is next directed to FIG. 6, which shows schematically an example of a video processing system 1 for use with the methods described herein. The video processing system 1 of FIG. 6 may be coupled to, or form part of, a computer device, such as a personal computer, a laptop, a smartphone or an on-board computer device which may be coupled to or mounted within a vehicle such as a car.

As shown in FIG. 6, the video processing system 1 includes an imaging device 50, which in turn includes an image sensor 51 and a sensor data processor 52, as well as a computing system 200, which will be described in further detail below. As shown in FIG. 6, the imaging device 50 and the computing system are in data communication by means of communication interface 70 (which may, for example, be a camera serial interface CSI, or an adapted version thereof).

While FIG. 6 shows the image sensor 51 and sensor data processor 52 as separate boxes, it should be understood that these may be provided within the same component, such as a suitable integrated circuit. Furthermore, although the imaging device 50 is shown as including only one sensor data processor 52, it should be understood that, the sensor module 50 might include several sensor data processors. Furthermore, depending on the particular application, the imaging device may include various additional components. For example, where the imaging device 50 is configured as a camera, it may include one or more lenses.

An image sensor 51 typically includes an array of sensor pixels, which may be any suitable sensors for capturing images, such as photosensors. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). As shown in FIG. 6, the imaging device 50 further includes a color filter array 53, which overlies the image sensor 51. The color filter array 53 causes each sensor pixel to receive light of only one color, for example only one of red, green and blue in an RGB filter or only one of cyan, magenta and yellow in a CMY filter.

The sensor data processor 52 may be configured (e.g. by suitable programming) to receive raw video data 10 from image sensor 51 that is representative of a plurality of frames 11 (for example as described above with reference to step 100), and to detect, using the raw video data 10, one or more regions of interest 20 in a detection frame 11($n$) of the plurality of frames 11 (for example as described above with reference to step 110). The sensor data processor 52 may be further configured to perform a cropping process on a portion of the raw video data representative of the detection frame 11($n$), so as to generate cropped raw video data (for example as described above with reference to step 120).

In other examples, processors within the computing system 200, such as CPU 220, may be configured (e.g. by suitable programming) to cooperate with the sensor data processor 52, such that they together carry out steps 100-120 of the methods described above with reference to FIGS. 1-5B. In still further examples, suitably programmed processors within the computing system 200, such as CPU 220, might carry out such method steps without any significant involvement of the sensor data processor 52.

In the example of FIG. 6, the image sensor module 50 is arranged to transfer video data, in particular cropped raw video data, to an image signal processor (ISP) 210 of a computing system 200 via communication interface 70. The ISP 210 may perform image processing on the cropped raw video data, so as to generate processed image data, for example as described above with reference to step 130.

The computing system 200 of FIG. 6 includes one or more processors. The one or more processors may, for example, be configured to analyze the processed image data, as generated by the ISP, to determine information relating to at least one of the regions of interest 20. In this example, the one or more processors of the computing system 200 include a central processor unit (CPU) 220, and a neural network accelerator 230, which is a processor dedicated to implementing processing of data, including feature detection. In other examples, however, feature detection operations may be implemented using a more general processor, such as a GPU, or the CPU 220, in which case the CPU 220 might be the sole processor within the computer system 200. In addition to, or instead of providing a neural network accelerator as part of computing system 200, a neural network accelerator may be provided as part of imaging device 50, for example integrated within the sensor data processor 52. This may be particularly appropriate in embodiments where the sensor data processor is programmed to detect regions of interest using a neural network.

In still other examples, the computing system 200 may include other or alternative processors such as a microprocessor, a general-purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing system 200 may also or alternatively include a processor implemented as a combination of computing devices, e.g., a combination of a DSP and a microprocessor, a plurality of microprocessors, one or more microprocessors in conjunction with a DSP core, or any other such configuration. The computing system may also or alternatively include at least one graphics processing unit (GPU).

The CPU 220 of FIG. 6 includes a driver 221 which for example provides an interface between software configured to control or configure the CNN accelerator 230 and/or other components of the computing system 220. The driver 221 may therefore form part of or correspond to a control system for controlling the operation of the one or more processors.

The computing system 200 of FIG. 6 also includes a dynamic memory controller (DMC) 240 which may be used to control access to storage 250 of the computing system 200. The storage 250 is for example configured to store the video data received from the ISP 210.

The storage 250 is for example external to the neural network accelerator 230 and may be a random-access memory (RAM) such as DDR-SDRAM (double data rate synchronous dynamic random-access memory). In other examples, the storage 250 may be or include a non-volatile memory such as Read Only Memory (ROM) or a solid-state drive (SSD) such as Flash memory. The storage 250 in examples may include further storage devices, for example magnetic, optical or tape media, compact disc (CD), digital versatile disc (DVD) or other data storage media. The storage 250 may be removable or non-removable from the computing system 200. In examples, the CNN accelerator 230 may also include local storage including one or more buffers, which may nevertheless be considered to form part of the storage of the video processing system 200.

The components of the computing system 200 in the example of FIG. 6 are interconnected using a systems bus 205. This allows data to be transferred between the various components. The bus 205 may be or include any suitable interface or bus. For example, an ARM® Advanced Microcontroller Bus Architecture (AMBA®) interface, such as the Advanced eXtensible Interface (AXI), may be used.

It is to be appreciated that the video processing system 1 of FIG. 6 is merely an example and other video processing systems may be used in other examples.

The above examples are to be understood as illustrative examples. Further examples are envisaged.

Furthermore, it is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of processing video data, the method comprising:
   receiving raw video data, representative of a plurality of frames;
   detecting, using said raw video data, one or more regions of interest in a detection frame of said plurality of frames;
   performing a cropping process on a portion of the raw video data representative of the detection frame, based on said one or more regions of interest, so as to generate cropped raw video data;
   performing image processing on said cropped raw video data, including demosaicing, so as to generate processed image data for the detection frame;
   scaling system processing resources in dependence upon a total magnitude of said one or more regions of interest, wherein said total magnitude is a total area or weighted sum of said one or more regions of interest; and
   analyzing said processed image data, with said scaled system processing resources, to determine information relating to at least one of said one or more regions of interest.

2. The method of claim 1, wherein said detecting of the one or more regions of interest utilises a first neural network and said analyzing of the processed image data utilises a second, different neural network.

3. The method of claim 1, wherein detecting one or more regions of interest in the detection frame comprises performing an object detection process on said portion of the raw video data representative of the detection frame.

4. The method of claim 3, wherein said object detection process utilises a region proposal network.

5. The method of claim 3, wherein analyzing said processed image data comprises performing at least one of a second objection detection process and an object classification process on said processed image data corresponding to said one or more regions of interest.

6. The method of claim 1, wherein analyzing said processed image data comprises performing at least one of an objection detection process and an object classification process on said processed image data corresponding to said one or more regions of interest.

7. A video processing system comprising:
   an imaging device, which comprises an image sensor;
   at least one processor; and
   storage accessible by the at least one processor, having stored thereon instructions which, when executed by the at least one processor, cause the at least one processor to:
   receive raw video data, which is representative of a plurality of frames and has been generated by said image sensor;
   detect, using said raw video data, one or more regions of interest in a detection frame of said plurality of frames;
   perform a cropping process on a portion of the raw video data representative of the detection frame, based on said one or more regions of interest, so as to generate cropped raw video data;
   perform image processing on said cropped raw video data, including demosaicing, so as to generate processed image data for the detection frame;
   scale system processing resources in dependence upon a total magnitude of said one or more regions of interest, wherein said total magnitude is a total area or weighted sum of said one or more regions of interest; and
   analyze said processed image data, with said scaled system processing resources, to determine information relating to at least one of said one or more regions of interest.

8. The video processing system of claim 7, wherein the at least one processor comprises an image signal processor, and wherein a portion of said instructions, when executed by the image signal processor, causes the image signal processor:
   receive said cropped raw video data; and
   perform image processing on said cropped raw video data, including demosaicing, so as to generate processed image data for the detection frame.

9. A non-transitory, computer-readable storage medium comprising a set of computer-readable instructions which, when executed by at least one processor, cause the at least one processor to:
   receive raw video data, which is representative of a plurality of frames and has been generated by an image sensor of an imaging device;
   detect, using said raw video data, one or more regions of interest in a detection frame of said plurality of frames;
   perform a cropping process on a portion of the raw video data representative of the detection frame, based on said one or more regions of interest, so as to generate cropped raw video data;
   perform image processing on said cropped raw video data, including demosaicing, so as to generate processed image data for the detection frame;
   scale system processing resources in dependence upon a total magnitude of said one or more regions of interest, wherein said total magnitude is a total area or weighted sum of said one or more regions of interest; and analyze said processed image data, with said scaled system processing resources, to determine information relating to at least one of said one or more regions of interest.

\* \* \* \* \*